US010199952B2

(12) United States Patent
Limvorapun et al.

(10) Patent No.: US 10,199,952 B2
(45) Date of Patent: Feb. 5, 2019

(54) QUAD-T TRANSFORMER TO CONVERT AC SINGLE-PHASE TO THREE-PHASE POWER

(71) Applicant: The Boeing Company, Chicago, IL (US)

(72) Inventors: Suhat Limvorapun, Huntington Beach, CA (US); Randy L. Brandt, Orange, CA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 15/051,924

(22) Filed: Feb. 24, 2016

(65) Prior Publication Data
US 2017/0243692 A1    Aug. 24, 2017

(51) Int. Cl.
*H02M 5/14* (2006.01)
*H01F 30/14* (2006.01)

(52) U.S. Cl.
CPC .............. *H02M 5/14* (2013.01); *H01F 30/14* (2013.01)

(58) Field of Classification Search
CPC ........ H01F 5/00; H01F 27/28; H01F 27/2823; H01F 27/245
USPC ............................................. 336/5, 200, 232
See application file for complete search history.

(56) References Cited

U.S. PATENT DOCUMENTS

| | | | |
|---|---|---|---|
| 2,462,058 A * | 2/1949 | Ahier ....................... | G01S 1/02 324/88 |
| 3,516,084 A * | 6/1970 | Sacks ....................... | H03M 1/00 341/116 |
| 3,809,980 A * | 5/1974 | Nottingham, Jr. ...... | H01F 30/14 318/768 |
| 4,499,392 A * | 2/1985 | Giacoletto ............. | H02K 31/00 310/168 |
| 4,807,269 A * | 2/1989 | Grady ...................... | H05G 1/10 363/3 |
| 6,177,651 B1 * | 1/2001 | Reynolds ............. | B23K 9/1068 219/130.1 |
| 7,145,268 B2 | 12/2006 | Edwards et al. | |
| 8,964,432 B2 | 2/2015 | Tang et al. | |
| 2011/0074533 A1 * | 3/2011 | Phadke ............... | H01F 27/2866 336/150 |

(Continued)

FOREIGN PATENT DOCUMENTS

| | | | | |
|---|---|---|---|---|
| GB | 948731 A | * | 2/1964 | ......... G05B 19/4105 |
| JP | 03030405 A | * | 2/1991 | |
| JP | 06245386 A | * | 9/1994 | |

*Primary Examiner* — Tsz Chan
(74) *Attorney, Agent, or Firm* — Sage Patent Group (57) ABSTRACT

A quad-T transformer in some embodiments includes a first split winding, a second split winding, and two orthogonal closed-loop windings coupled between the first split winding and the second split winding. Wires can be wound around magnetic cores. A first of the two orthogonal closed-loop windings is coupled to a first portion of each of the first split winding and the second split winding. A second of the two orthogonal closed-loop windings is coupled to a second portion of each of the first split winding and the second split winding. A bi-directional single-phase/three-phase converter includes the quad-T transformer and a Scott-T transformer with an output connected to a three-phase connection. The Scott-T transformer also has a 90-degree input connected to the quad-T transformer and a zero-degree input connected to a single-phase connection.

20 Claims, 5 Drawing Sheets

(56) References Cited

U.S. PATENT DOCUMENTS

2016/0197605 A1\* 7/2016 Nussbaum ........... H03K 17/687
  330/277

\* cited by examiner

QUAD-T TRANSFORMER TO CONVERT AC SINGLE-PHASE TO THREE-PHASE POWER

FIELD

This invention related to electrical power supply and distribution and more particularly to the use of single-phase and three-phase AC power.

BACKGROUND

Energy and power transfer has generally relied on three-phase generators. A rotating generator converts mechanical, chemical, and/or thermal energy into electrical power. A three-phase generator along with a transformer can provide a high-voltage electrical current for transmission. A transformer near the point of use can step the voltage back down to lower, single-phase voltage, which is typically required for residences and smaller business. Single-phase AC power of various frequencies is also sometimes produced on large vehicles, aircraft, and spacecraft for use by on-board devices.

Some machines require three-phase input power. Where three-phase power is not available, a single-phase to three-phase adapter will allow three-phase hardware to be used with a single-phase outlet. Typical single-phase to three-phase adapters use solid-state switching devices. In most environments, circuitry must be included to deal with switching noise generated by such adapters. These adapters must be replaced or repaired regularly, especially in harsh environments where the solid-state devices are prone to failure or otherwise have a limited useful life.

SUMMARY

In at least some embodiments of the invention, a transformer that provides a 90-degree phase shift in an AC supply voltage includes a first split winding, a second split winding, and two orthogonal closed-loop windings coupled to the first split winding and the second split winding. In some embodiments, a first of the two orthogonal closed-loop windings is coupled to a first portion of each of the first split winding and the second split winding and a second of the two orthogonal closed-loop windings is coupled to a second portion of each of the first split winding and the second split winding.

The above arrangement forms a plurality of coupling points, for example, four coupling points that may be referred to herein as four quadrants. In some embodiments, a plurality of magnetic cores is associated with the plurality of coupling points such that around each of which is wound one of the portions of the first split winding or the second split winding and one of the two orthogonal closed-loop windings. Some or all of these components may be mounted on a non-magnetic plate or surface, which may be made at least in part from fiberglass. A transformer as thus described may be referred to herein as a "quad-T" transformer.

In at least some embodiments of the invention, a single-phase/three-phase converter includes a three-phase connection for three-phase AC voltage, a quad-T transformer as described above having a single-phase connection at what might be referred to as the first split winding, and a Scott-T transformer with an output wired to the three-phase connection. The three-phase and single-phase connections might each be considered either an input or an output depending on which direction current is flowing through the converter. The Scott-T transformer in such an embodiment also has a 90-degree input connected to the quad-T transformer and a zero-degree input wired to the single-phase connection.

The converter can be assembled by winding a first wire around first and second magnetic cores to form a first split winding and winding a second wire around third and fourth magnetic cores to form a second split winding. A third wire is wound around the first and third magnetic cores and a fourth wire is wound around the second and fourth magnetic cores so that two orthogonal closed-loop windings are coupled to the first split winding and the second split winding to form the quad-T transformer. A Scott-T transformer is then wired to both the quad-T transformer and a single phase connection for the single-phase/three-phase converter.

DETAILED DESCRIPTION

Embodiments of the invention provide a transformer that produces a 90-degree phase shift in an AC supply voltage. The transformer includes a first split winding, a second split winding, and two orthogonal closed-loop windings coupled to the first split winding and the second split winding, and may be referred to herein as a "quad-T" transformer. A bi-directional single-phase/three-phase converter according to embodiments of the invention includes the quad-T transformer and a Scott-T transformer with an output wired to the three-phase connection. The Scott-T transformer also has a 90-degree input connected to the quad-T transformer and a zero-degree input wired to a single-phase connection. The single-phase/three-phase converter according to embodiments of the invention provides power conversion from single phase to three phases and vice versa. The quad-T transformer provides for the conversion from one phase into a phase shifted by 90 degrees. This voltage with a 90 degrees phase shift can work with a Scott-T transformer to create three-phase output. The converter can also be wired in reverse to convert three-phase input power to single-phase output power.

There will be less electromagnetic noise generated by the present converter as compared to converters using solid-state switches. The quad-T transformer and the converter can be optimized for use with various sinusoidal frequencies up to several kHz, for example 50 Hz or 400 Hz. A household single-phase wall outlet can be transformed into three-phase output used for a pool or spa pump. Conversely, a three-phase output from a power substation can be converted directly into a single-phase output without balancing phases while splitting 120 Volt or 240 Volt line.

The converter described herein is highly reliable, and will have a relatively long useful life since it relies on transformers and does not make use of semiconductor switches. These characteristics make the converter of the present invention suitable for harsh environments. Transformers, being passive, are not as subject to ill effects from radiation, heat, cold, etc. as semiconductor devices are. The converter described herein is efficient since the only loss occurs in the windings and cores.

This detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
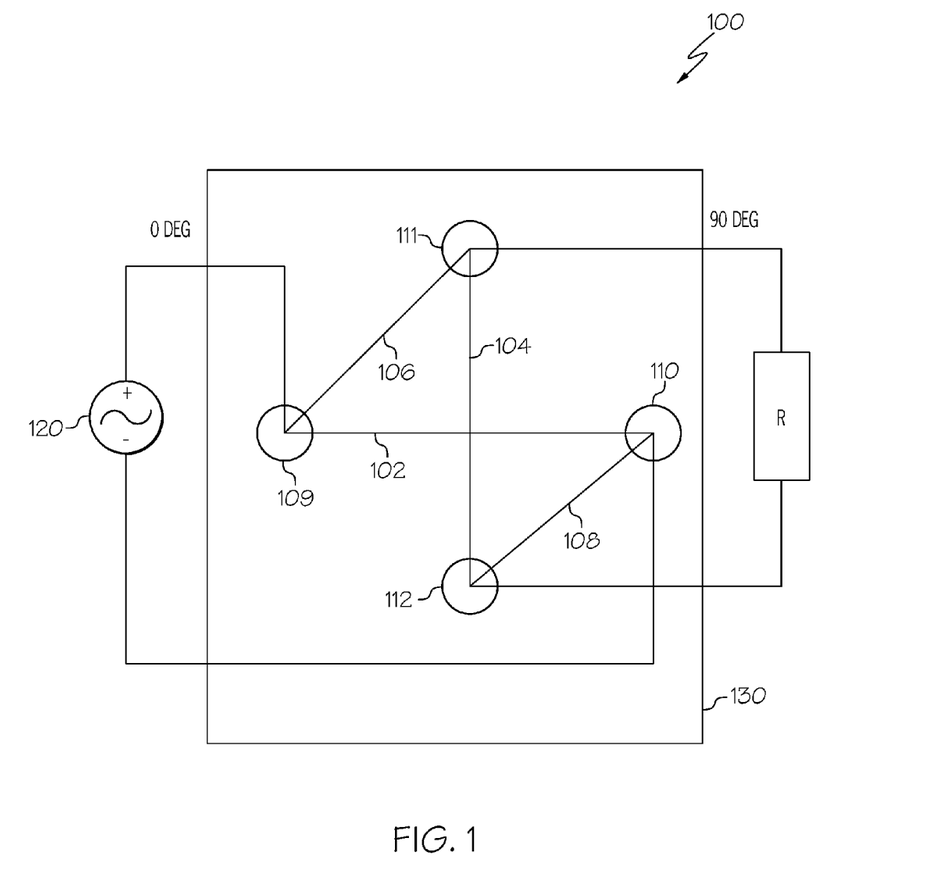
FIG. 1 is a graphical illustration of the nature and method of construction of a quad-T transformer according to example embodiments of the invention.
Figure 2:
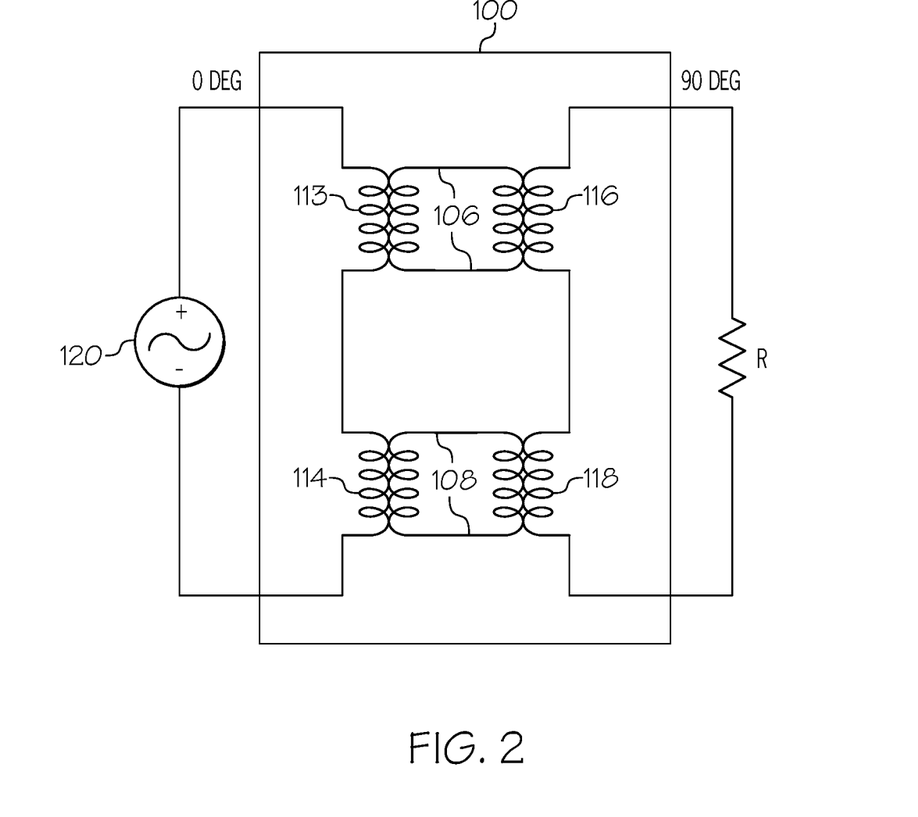
FIG. 2 is a schematic diagram of a quad-T transformer according to example embodiments of the invention.

FIG. 1 is a graphical illustration that shows the construction and method of assembly of a quad-T transformer 100 according to example embodiments of the invention. FIG. 2 is a schematic diagram of the transformer of FIG. 1. For some components clearly visible in both drawings, like reference numbers are used in the two drawings. Winding 102 is a first split winding and winding 104 is a second split winding. The way the transformer is pictured, the first split winding might be called the split input winding and the second split winding might be called the split output winding, but this is specific only to this example as the device is bi-directional. Two, orthogonal closed loop windings 106 and 108 are coupled to the split input and output windings. The added closed loop windings have the effect of dividing the input and output windings in half resulting in four coupling points or quadrants of the transformer.

To provide sufficient coupling in the embodiment shown in FIG. 1 and FIG. 2, four magnetic cores 109, 110, 111, and 112 are used to couple the windings together, with one core being associated with each coupling point so that a plurality of cores is associated with a plurality of coupling points. In some embodiments, the magnetic cores take the form of ferrite beads or toroids, but other shapes can be used. The first split winding is divided into a first portion 113 and a second portion 114, and the second split winding is divided into a first portion 116 and a second portion 118.

In some embodiments, to provide a mechanically stable package, some or all of the components can be mounted in a non-magnetic plate 130, which may be a fiberglass or "glass" circuit board. These can include the magnetic cores, all or portions of the two orthogonal closed-loop windings, all or portions of the first split winding, and/or all or portions of the second split winding. In the quad-T transformer of FIG. 1 and FIG. 2, the flux interaction between the orthogonal closed loop windings with the four quadrant windings produces a 90-degree phase shift at the output connection to a load R, relative to an input voltage 120, which is considered to be zero degrees.

As previously mentioned, the words "input" and "output" are relevant only in the context of specific illustrated examples, since generally, the devices disclosed herein are bi-directional in their operation. It should also be noted that these words, as well as the word "connection" such as used in the phrases "90-degree connection" or "input connection" are not meant to imply a device that is connected to power and actively being used. Rather, the term "connection" is meant to refer to the physical wiring posts, a snap-fit connector, solder pads, un-terminated wires, or the like that are used to install the device, whether or not the device has actually been installed for use in an electrical system.

Figure 3:
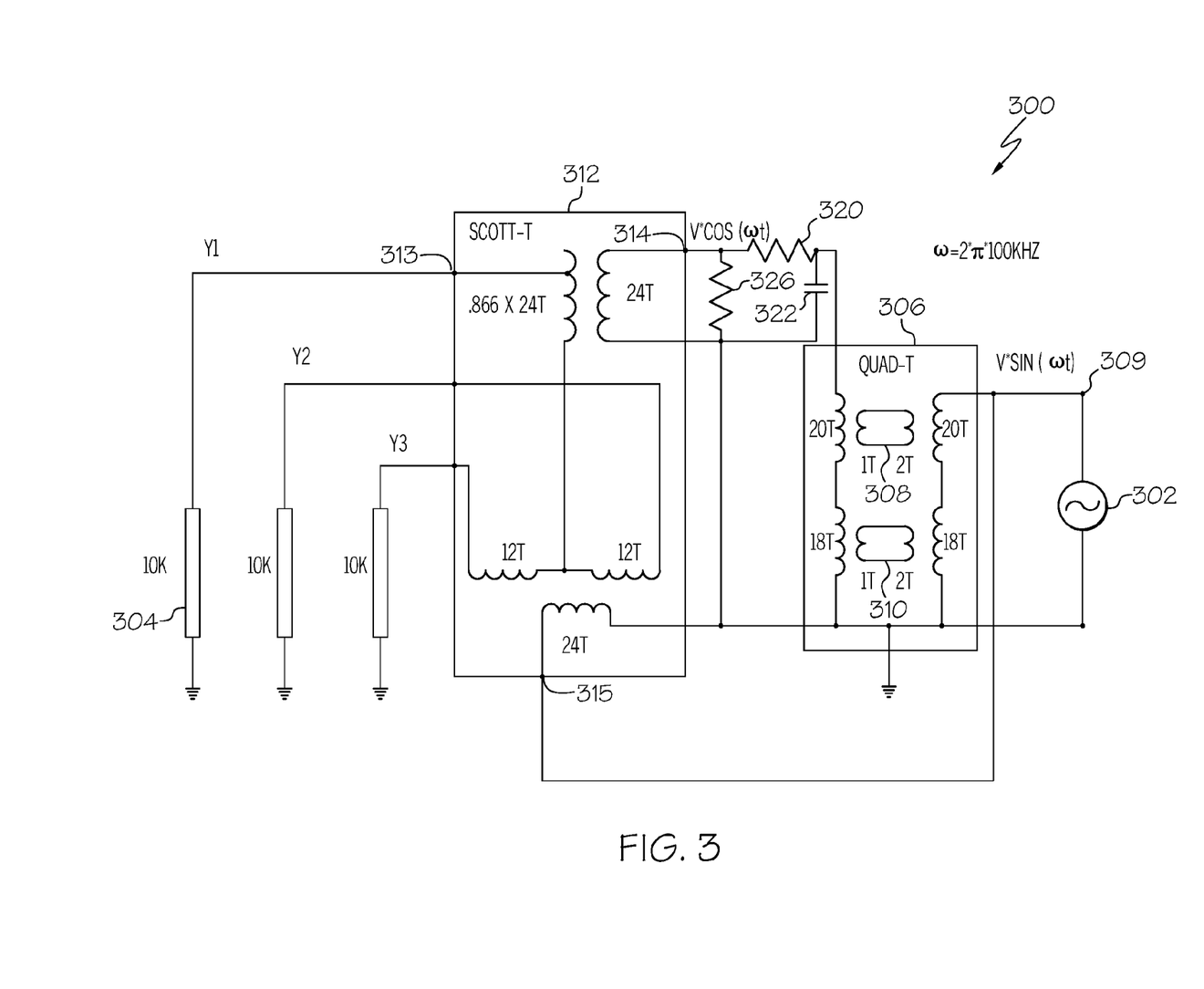
FIG. 3 is a schematic diagram of a single-phase/three phase converter according to example embodiments of the invention.

FIG. 3 is a schematic diagram of a bi-directional single-phase/three-phase converter according to some example embodiments of the invention. Converter 300 is illustrated connected to convert single-phase power into three-phase power, with source 302 and an identical 10 kohm load 304 on each phase, Y1, Y2, and Y3 of a three-phase connection for the converter. The source and loads are not part of the converter itself. As previously noted, directional and/or input/output terminology here is only for context in the specific illustration since the device is bi-directional and can convert power flowing in either direction. An AC input voltage of frequency ω, V sin(ωt), is coupled to a single phase connection of the converter and quad-T transformer 306. Quad-T transformer 306 includes a first split winding and a second split winding as previously described. In this example, orthogonal closed loop winding 308 is coupled between the first portions of the two split windings. These portions are wound with 20 turns each, and the orthogonal closed loop winding is wound with a single turn at on the 90-degree output side and two turns on the 0-degree input side at the single-phase connection 309 for the device. Orthogonal closed loop winding 310 is coupled between the second portions of the two split windings. These portions are wound with 18 turns each, and the orthogonal closed loop winding 310 is again wound with a single turn on the 90-degree output side and two turns on the 0-degree input side, at the single-phase connection for the converter. For this example embodiment, ferrite cores are used to couple the windings of the quad-T transformer. The quad-T transformer produces a 90-degree output V cos(ωt).

A Scott-T transformer converts two-phase power into three-phase power or vice versa. A Scott-T transformer is a combination of two sub-transformers wired together. One transformer is center-tapped and the other is tapped at 86.6%, both on the three-phase side of the circuit. The primaries of both sub-transformers are connected to the two-phase side of the circuit.

Continuing with FIG. 3, Scott-T transformer 312 is built with 24 turn windings. A single 24 turn winding is used at each of its 0-degree input 315 (0-degree common input) and the 90-degree input 314 (90-degree output of the quad-T transformer). The Scott-T transformer 312 obtains 0-degree power from the common input with the quad-T transformer and 90-degree power through the quad-T transformer itself. The winding coupled to phases Y2 and Y3 at the three-phase connection 313 for converter 300 is center-tapped with 12 turns on each of phase Y2 and Y3. The winding coupled to phase Y1 is another 24 turn winding that is tapped at 86.6%. Connected between the two transformers of the converter are resistor 320 for impedance matching, capacitor 322 to cancel out parasitic inductance, and bleeder resistor 326. Together, these components provide balancing. However, some or all of these balancing components can be eliminated by designing the converter using appropriate core gaps, taps, and/or winding techniques, leaving only the transformers. The entire converter 300 can be enclosed or otherwise mounted on a non-magnetic plate (not shown) for physical stability as previously discussed with regard to the quad-T transformer. Alternatively, multiple housings or plates can be used for the two transformers or some of their components.

A transformer can be made more compact and rigid than one using ferrite cores on a fiberglass board, though the ferrite cores described above work well for relatively high frequencies. Laminated steel sheets, soft iron, or an alloy designed for harsh environments can also be used as transformer cores. Laminated iron sheets can be used to construct a quad-T transformer core that works well at lower frequencies, such as the 50 Hz or 60 Hz used with AC power that is common in building mains. Planar transformer configurations can provide a small and compact AC conversion of a converter on a printed circuit board.

A typical transformer can be built with either a 0 degree or 180 degree phase shift. The quad-T transformer according to example embodiments of the invention provides a 90 degree phase shift that can be used in conjunction with a common input/output and a Scott-T transformer as shown to generate a three-phase output. The bi-directional transformers work equally well to provide a converter that works in reverse relative to that described above, converting a three-phase input to a single-phase output. All that is needed is the reversal of the voltage and the load.

The particular example of FIG. 3 is used with a 100 kHz single phase source, such that for $\omega$ in the voltage equations given above $\omega=2\pi 100$ kHz and the output of the converter is the same voltage as the input. The number of turns of the various windings can be tuned to provide a different voltage output in either direction and can also be adjusted to handle the appropriate amount of power or to operate most efficiently at various frequencies.

Figure 4:
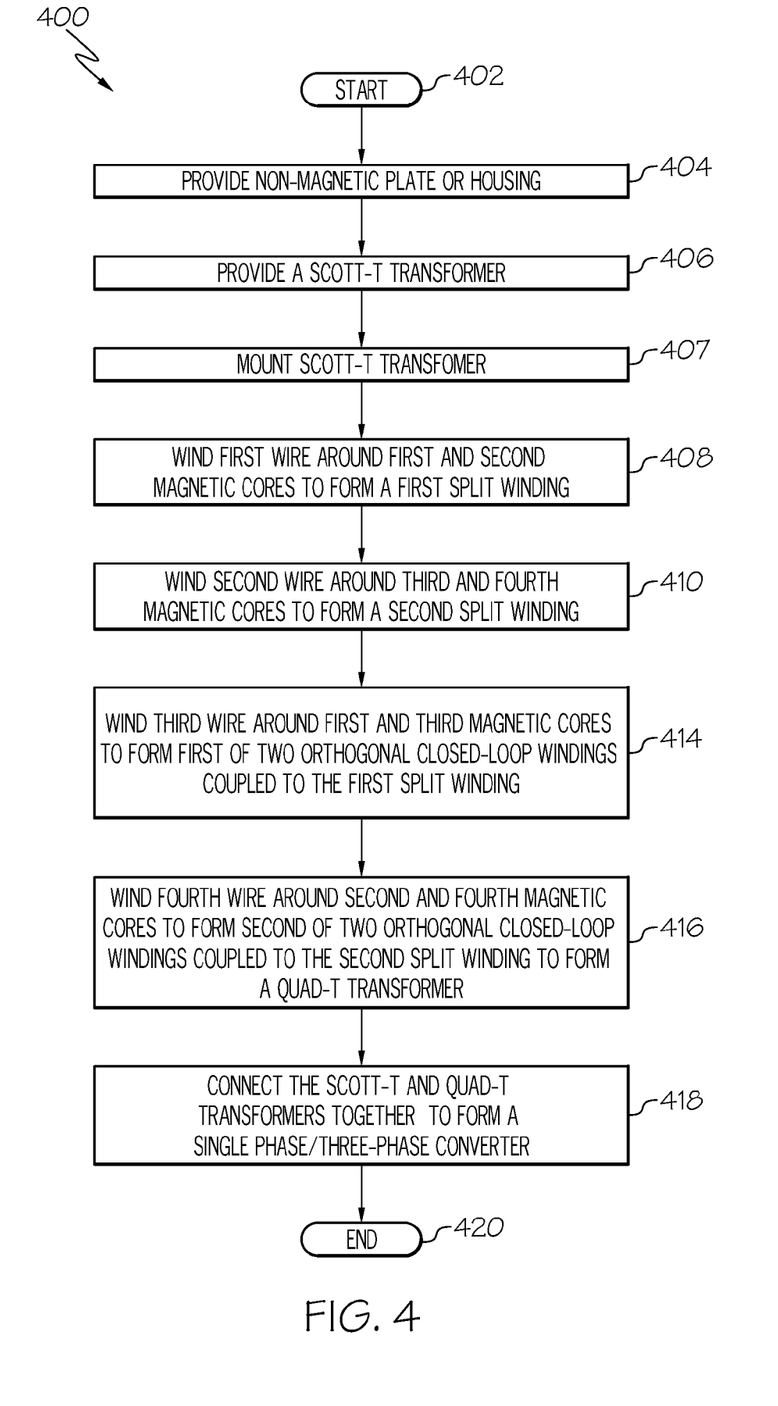
FIG. 4 is a flowchart illustrating a method of assembling a single-phase/three phase converter according to example embodiments of the invention.

FIG. 4 is a flowchart illustrating an example method of assembling a single-phase/three-phase converter according to at least some embodiments of the invention. Like many flowcharts, FIG. 4 illustrates process 400 as a series of process or subprocess blocks. The process starts at block 402 and the non-magnetic mounting plate, housing, or the like is provided at block 404. Scott-T transformer is provided at block 406 and mounted at block 407, though this subprocess can be carried out at any time, depending on the assembly method. To form the windings in some embodiments, a first wire is wound around a first and second of the magnetic cores at block 408 to form the first split winding, and a second wire is wound around the third and fourth magnetic cores at block 410 to form the second split winding. A third wire is wound around the first and third magnetic cores to form one orthogonal closed-loop winding at block 414 and a fourth wire is wound around the second and fourth magnetic cores at block 416 to form the other orthogonal closed-loop winding of the two orthogonal closed loop windings. Magnetic cores and portions of the windings may be mounted or secured in a housing at the beginning, end, or any other point during the assembly process. At block 418 the Scott-T and quad-T transformers are connected together to form the single-phase/three-phase converter.

Figure 5:
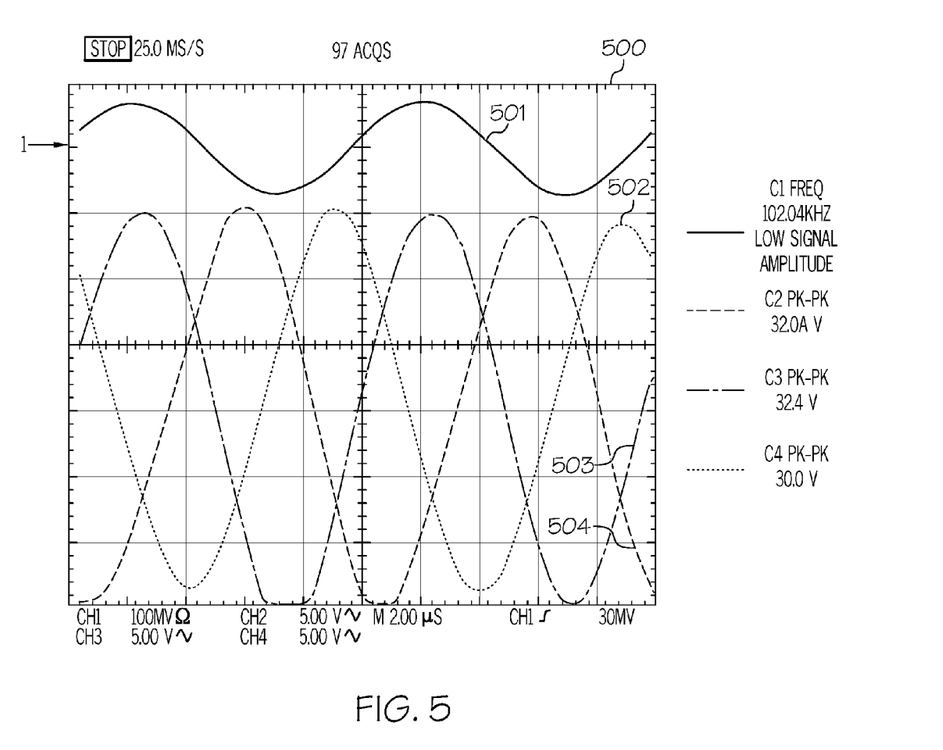
FIG. 5 is a voltage plot showing the input and output voltage waveforms of the single-phase/three phase converter according to example embodiments of the invention.

FIG. 5 is an oscilloscope plot 500 showing the input and output voltage waveforms for a bi-directional single-phase/three-phase converter like that shown in FIG. 3. Waveform 501 is the input waveform on channel 1 (C1), with a nominal frequency of 102.04 kHz. The waveforms of the three output phases are shown at 502 for C2, 503 for C3 and 504 for C4. The remaining annotations shown in FIG. 4 will be familiar to those skilled in the electrical arts.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

The invention claimed is:

1. A transformer (100) to provide a 90-degree phase shift in an AC supply voltage, the transformer comprising:
   a first split winding (102) comprising a first portion (113) and a second portion (114);
   a second split winding (104) comprising a first portion (116) and a second portion (118); and
   a first orthogonal closed-loop winding coupled to the first portion of the first split winding and to the first portion of the second split winding;
   a second orthogonal closed-loop winding coupled to the second portion of the first split winding and to the second portion of the second split winding; and
   a plurality of magnetic cores associated with a plurality of coupling points (109, 110, 111, 112), around each of which is wound one of the portions of the first split winding or the second split winding and one of the first orthogonal closed-loop winding or the second orthogonal closed-loop winding.

2. The transformer of claim 1 wherein at least some of the plurality of magnetic cores further comprise ferrite.

3. The transformer of claim 1 wherein at least some of the plurality of magnetic cores further comprise laminated sheets of iron or steel.

4. The transformer of claim 1 wherein at least some of the plurality of magnetic cores further comprise soft iron.

5. The transformer of claim 1 further comprising a non-magnetic plate (130) connected to at least some of the plurality of magnetic cores, portions of the first orthogonal closed-loop winding and the second orthogonal closed-loop winding, portions of the first split winding, and portions of the second split winding.

6. The transformer of claim 5 wherein the non-magnetic plate comprises fiberglass.

7. A single-phase/three-phase converter (300) comprising:
   a three-phase connection (313) for three-phase AC voltage;
   a quad-T transformer (306) having a single-phase input connection (309); and
   a Scott-T transformer (312) wired to the three-phase connection and having a 90-degree input connected to the quad-T transformer and a zero-degree input wired to the single-phase input connection, wherein the quad-T transformer further comprises:
a first split winding (102) wired to the single-phase input connection;
a second split winding (104) connected to the 90-degree input of the Scott-T transformer; and
two orthogonal closed-loop windings (106, 108) coupled to the first split winding and the second split winding.

8. The converter of claim 7 wherein a first (106) of the two orthogonal closed-loop windings is coupled to a first portion (113, 116) of each of the first split winding and the second split winding and a second (108) of the two orthogonal closed-loop winding is coupled to a second portion (114, 118) of each of the first split winding and the second split winding to form a plurality of coupling points.

9. The converter of claim 8 further comprising at least one balancing component (320, 322, 326) connected between the Scott-T transformer and the quad-T transformer.

10. The converter of claim 8 further comprising a plurality of magnetic cores associated with the plurality of coupling points (109, 110, 111, 112), around each of which is wound one of the portions of the first split winding or the second split winding and one of the two orthogonal closed-loop windings.

11. The converter of claim 10 wherein the plurality of magnetic cores comprise at least one of ferrite and soft iron.

12. The converter of claim 10 wherein the plurality of magnetic cores comprise laminated sheets of iron or steel.

13. The converter of claim 10 further comprising a non-magnetic plate (130) connected to at least some of the plurality of magnetic cores, portions of the two orthogonal closed-loop windings, portions of the first split winding, the Scott-T transformer, and/or portions of the second split winding.

14. The converter of claim 13 wherein the non-magnetic plate comprises fiberglass.

15. A method of assembling a single-phase/three-phase converter, the method comprising:
providing (406) a Scott-T transformer (312);
winding (408) a first wire around first and second magnetic cores to form a first split winding (102);
winding (410) a second wire around third and fourth magnetic cores to form a second split winding (104);
winding (414) a third wire around the first and third magnetic cores and winding (416) a fourth wire around the second and fourth magnetic cores to form two orthogonal closed-loop windings (106, 108) coupled to the first split winding and the second split winding to form a quad-T transformer (306); and
connecting (418) the Scott-T transformer to both the quad-T transformer and a single phase connection for the single-phase/three-phase converter.

16. The method of claim 15 further comprising mounting (407) at least a portion of at least one of the Scott-T transformer and the quad-T transformer on a non-magnetic plate (130).

17. The method of claim 16 wherein the non-magnetic plate comprises fiberglass.

18. The method of claim 15, further comprising connecting at least one balancing component between the Scott-T transformer and the quad-T transformer.

19. The method of claim 15, wherein the magnetic cores comprise one of ferrite and soft iron.

20. The method of claim 15, wherein the magnetic cores comprise one of laminated sheets of iron or steel.

* * * * *